No. 830,961. PATENTED SEPT. 11, 1906.
F. L. BINFORD.
RUNNING GEAR FOR VEHICLES.
APPLICATION FILED FEB. 12, 1903. RENEWED MAR. 7, 1906.

2 SHEETS—SHEET 1.

Witnesses.
Inventor:
Frank L. Binford

No. 830,961. PATENTED SEPT. 11, 1906.
F. L. BINFORD.
RUNNING GEAR FOR VEHICLES.
APPLICATION FILED FEB. 12, 1903. RENEWED MAR. 7, 1906.
3 SHEETS—SHEET 2.
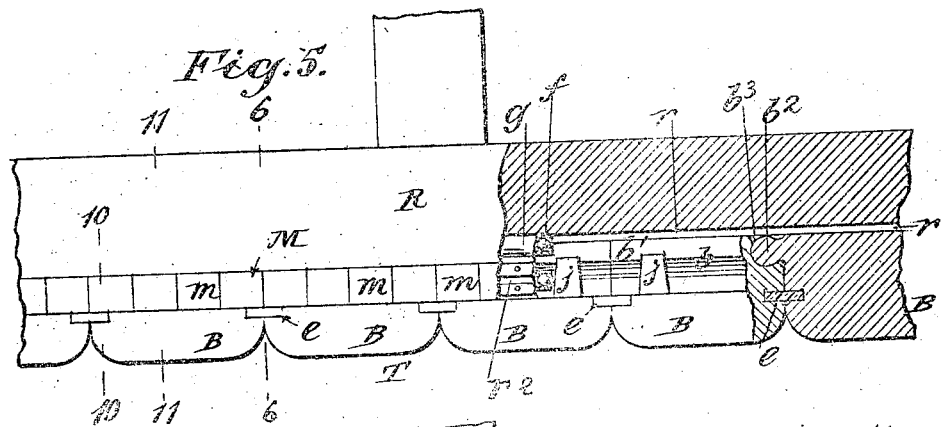
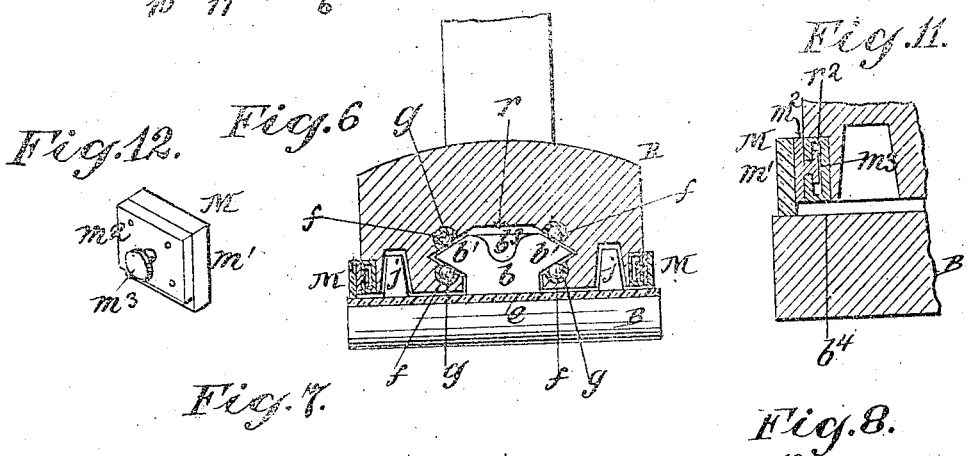
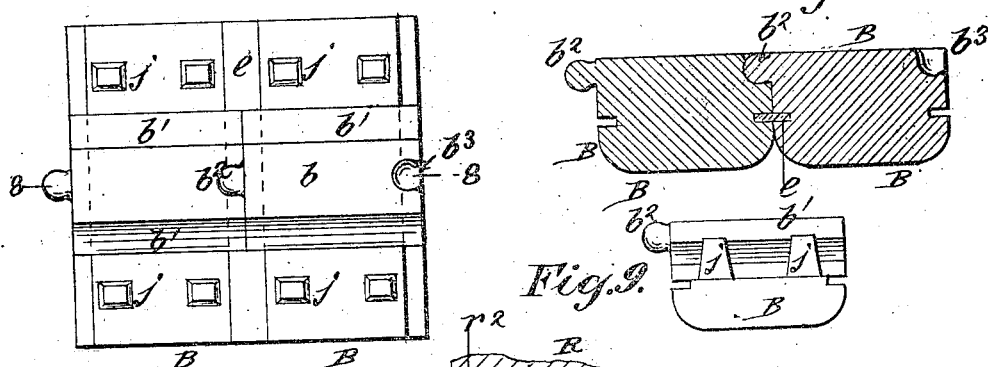
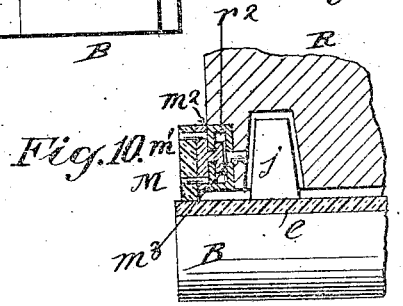
Witnesses.
Inventor:
Frank L. Binford

UNITED STATES PATENT OFFICE.

FRANK L. BINFORD, OF LOS ANGELES, CALIFORNIA.

RUNNING-GEAR FOR VEHICLES.

No. 830,961.     Specification of Letters Patent.     Patented Sept. 11, 1906.

Original application filed December 6, 1901, Serial No. 84,900. Divided and this application filed February 12, 1903. Renewed March 7, 1906. Serial No. 304,768.

*To all whom it may concern:*

Be it known that I, FRANK L. BINFORD, a citizen of the United States, residing in the city and county of Los Angeles, State of California, have invented certain new and useful Improvements in Running-Gear for Vehicles, of which the following is a specification.

My invention relates to running-gear for vehicles, and is designed to reduce frictional resistance and increase tractional power and speed.

The invention consists in the construction and arrangement of parts hereinafter described and claimed specifically, and is a subdivision of the subject-matter disclosed in my application for patent filed December 6, 1901, Serial No. 84,900.

Figure 1:
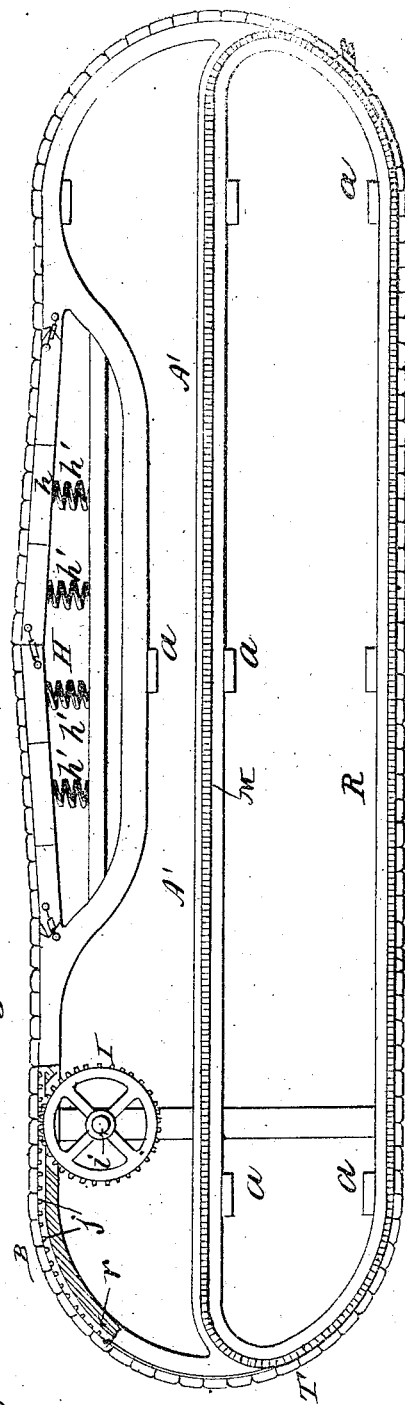
Figure 4:
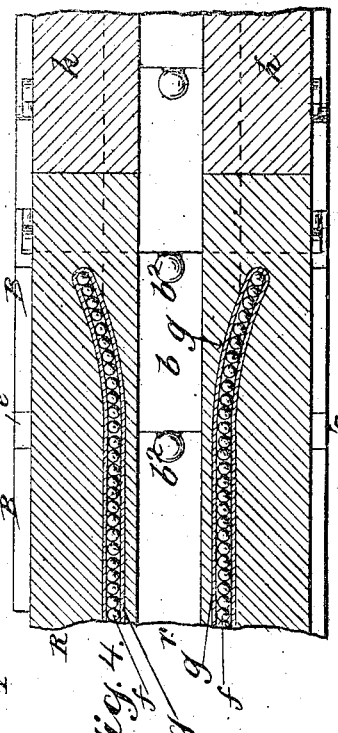
Figure 3:
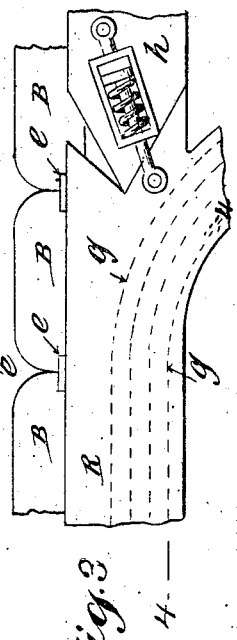
Figure 2:
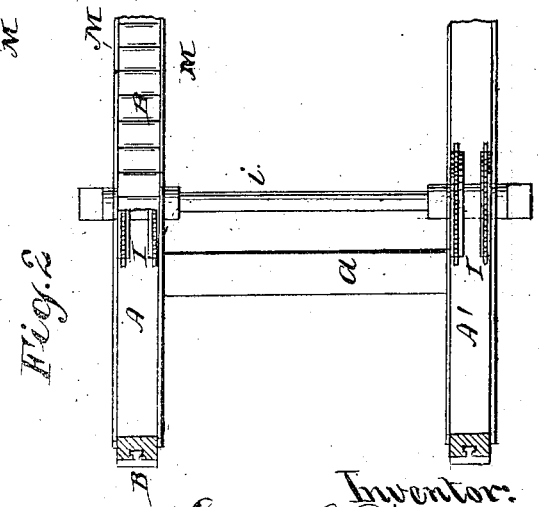

In the accompanying drawings, Figure 1 is a side elevation, partly in section, of one of my improved runners. Fig. 2 is a top view, partly in section, of the ends of two parallel runners, such as shown in Fig. 1 above. Fig. 3 is a detail view, upon an enlarged scale, of a portion of one of the side frames and adjoining portion of the movable track. Fig. 4 is a section upon plane of line 4 4, Fig. 3. Fig. 5 is a sectional elevation, upon an enlarged scale, of a portion of the lower framework and the movable track. Fig. 6 is a transverse section upon plane of line 6 6, Fig. 5. Fig. 7 is a top view of two sections of the movable track. Fig. 8 is a sectional view, upon plane of line 8 8, Fig. 7; Fig. 9, a side elevation of one of the movable track-sections. Fig. 10 is a partial sectional view, upon an enlarged scale, taken upon plane of line 10 10, Fig. 5. Fig. 11 is a sectional view taken upon plane of line 11 11, Fig. 5. Fig. 12 is an isometrical perspective view of one of the sections of the mud-guard.

In the accompanying drawings I illustrate means for carrying my invention into practical operation, although I do not confine myself to the identical form or construction of parts shown in the accompanying drawings, since it is obvious that various modifications may be made therein without departing from the spirit and intent of my invention.

A A' represent two side frames united by cross members $a$ or by other suitable framework. The rim R of each frame A A' is formed with an endless groove $r$, extending longitudinally, in which groove $r$ are situated the beveled extensions $b$ of the blocks or sections B, which constitute the endless movable track T. Antifriction-rollers $f$ are arranged within the rim R to bear against the beveled portions $b'$ of the extensions $b$ of the blocks B, as shown in Fig. 6. These antifriction-rollers $f$ are preferably partially inclosed in metallic runways $g$.

The several sections B of the movable track T may be coupled together by means of ball-and-socket joints $b^2$ $b^3$ or by other suitable mechanical expedient, although this is not indispensable, since the groove $r$ or equivalent structure of parts may be relied upon to maintain the alinement of the sections B under certain conditions of use. They are also connected by means of elastic coupling strips or ligatures $e$, preferably of waterproof material, so as to exclude moisture and extraneous matter from the blocks or sections B.

In order to still further guard against the intrusion of moisture or extraneous matter, each side of each rim R is provided with a traveling mud-guard M, composed of a series of sections $m$. These sections $m$ each consists of a facing of rubber $m'$ or like flexible waterproof material secured to a metallic plate $m^2$, formed with a shouldered tongue $m^3$, which rests in an endless raceway $r^2$. The lower edge of the flexible material $m'$ rests against the surface $b^4$ of a block B and travels with the same, thereby avoiding the frictional resistance that would otherwise result between the opposed surfaces in contact were the mud-guard stationary. Since it is only the lower portion of the movable track that is necessarily thus protected, the raceway $r^2$ need not necessarily be carried around the rim, but may extend longitudinally along a substantially horizontal member of the side frame, as illustrated in Fig. 1.

The sections B of the endless movable track T being coupled together, as hereinbefore described, are made to pass over a yielding bridge or take-up H, which compensates for any slack or looseness as well as for wear between the parts. This automatic take-up H may obviously consist of various well-known mechanical expedients. In the accompanying drawings I have shown it as consisting of hinged sections $h$, resting upon springs $h'$, which tend constantly to raise the tension-bridge against the resistance of the endless movable track T.

In order to shunt the antifriction-rollers $f$ around this automatic tension H, their raceways g are extended around and below the same, as will be understood by reference to Figs. 1, 3, and 4, the raceway g again guiding the antifriction-rollers f into contact with the beveled surfaces of the block extensions b after the latter have passed over the said tension device H.

The traction device, as hereinbefore described, may be used in lieu of road wheels or runners upon a vehicle drawn by any suitable power. When applied to a self-moving vehicle, as an automobile, power may be applied directly to the endless movable track T by any suitable mechanical expedient, as by a toothed wheel I, situated upon a suitable power-shaft i and meshing with teeth j, formed for the purpose on the blocks B.

In a vehicle designed to be drawn by animal power the ball-and-socket joints uniting the sections B into a chain may be omitted, and likewise the teeth j, adapting it to be driven by a motor, the sections B being rendered smooth at their ends without balls or sockets or other connecting devices and held in position by the groove in the rim, said groove, with its circuits of ball-bearings, being continued at the top similarly to the bottom of the sleigh-runner and the tension device omitted. Also in some cases the vehicle may be operated without the mud-guard and without the interposed strips of waterproof material for excluding dirt, &c., the recesses therefor being dispensed with. In the vehicle drawn by animal power the ball-bearing joints $b^2$ $b^3$ are not shunted, but carried around the top in the same manner (shown in cross-section in Fig. 6) for the bottom.

What I claim as my invention, and desire to secure by Letters Patent, is—

1. In running-gear for vehicles, the combination of a supporting-frame, an endless movable track supported upon and between two or more series of antifriction devices, and said plural series of antifriction devices are ranged to bear upon opposite surfaces formed on the said endless movable track whereby the latter is sustained entirely by and between antifriction-surfaces, as set forth.

2. In running-gear for vehicles, the combination of a supporting-frame, an endless movable track resting upon two series of antifriction devices, and said two opposed series of antifriction devices arranged in the said supporting-frame in such manner as to support the movable track at two independent points, substantially as set forth.

3. In running-gear for vehicles, the combination of a supporting-frame an endless movable track, antifriction devices for supporting the said endless movable track upon the frame, and an automatic tension device for taking up the slack of the said movable track, for the purpose set forth.

4. In running-gear for vehicles, the combination of a supporting-frame, an endless movable track, antifriction devices for supporting said movable track upon the frame, an automatic tension device for taking up the slack of the endless track, and means for shunting the antifriction devices around said automatic tension device, substantially in the manner and for the purpose set forth.

5. In running-gear for vehicles, the combination of a supporting-frame, an endless movable track, antifriction devices upon opposite sides of the track for supporting said endless movable track, and means for transmitting power to said endless movable track, for the purpose set forth.

6. In running-gear for vehicles, the combination of an endless track a supporting-frame, antifriction devices between which said track is disposed for supporting said endless movable track on said frame, said endless movable track formed with teeth for engagement with a driving gear-wheel, and said driving gear-wheel mounted upon a power-shaft for the purpose and substantially as set forth.

7. In running-gear for vehicles, the combination of an endless track a suitable frame, antifriction devices between which said track is disposed for supporting said endless movable track thereon, and said endless movable track formed with articulated sections united by ball-and-socket joints, substantially as herein shown and described.

8. In running-gear for vehicles, the combination of an endless track a suitable frame, antifriction devices between which said track is disposed for supporting said endless movable track thereon, and said movable track formed of a series of articulated sections having elastic waterproof ligatures interposed between them substantially in the manner and for the purpose set forth.

9. In running-gear for vehicles, the combination of an endless track a suitable frame, antifriction devices between which said track is disposed for supporting said endless movable track thereon, and said movable track consisting of a series of articulated sections B, formed with the beveled extensions b, for engagement with the antifriction devices, substantially as set forth.

10. In running-gear for vehicles, the combination of a suitable frame, an endless movable track, antifriction devices between which said track is disposed for supporting said endless track upon said frame, an endless traveling dust-guard mounted upon the frame and bearing upon and traveling with the endless movable track, substantially as herein set forth.

FRANK L. BINFORD.

Witnesses:
D. W. GARDNER,
FRANK E. ROACH.